US008832253B2

(12) United States Patent
Ohki

(10) Patent No.: US 8,832,253 B2
(45) Date of Patent: Sep. 9, 2014

(54) INFORMATION PROCESSING DEVICE, INFORMATION PROCESSING METHOD, AND COMPUTER PROGRAM

(75) Inventor: Yoshihito Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 13/463,620

(22) Filed: May 3, 2012

(65) Prior Publication Data

US 2012/0290682 A1     Nov. 15, 2012

(30) Foreign Application Priority Data

May 12, 2011  (JP) ................................. 2011-107108

(51) Int. Cl.
| | | |
|---|---|---|
| G06F 15/173 | (2006.01) | |
| H04W 4/02 | (2009.01) | |
| G06F 3/01 | (2006.01) | |
| H04W 76/02 | (2009.01) | |
| H04M 1/725 | (2006.01) | |
| G06F 1/16 | (2006.01) | |

(52) U.S. Cl.
CPC .......... *H04W 4/026* (2013.01); *H04M 2250/64* (2013.01); *H04W 76/023* (2013.01); *H04M 2250/12* (2013.01); *H04M 1/72519* (2013.01); *G06F 1/1694* (2013.01); *H04M 1/7253* (2013.01); *G06F 3/017* (2013.01)
USPC ............ 709/223; 709/203; 348/632; 348/730

(58) Field of Classification Search
USPC .......... 709/223, 224, 203, 217, 219; 348/632, 348/633, 730, 738
See application file for complete search history.

(56) References Cited

U.S. PATENT DOCUMENTS

| | | | | |
|---|---|---|---|---|
| 8,605,034 | B1 * | 12/2013 | Roy ............................... | 345/156 |
| 2006/0142082 | A1 * | 6/2006 | Chiang et al. .................... | 463/36 |
| 2006/0271999 | A1 * | 11/2006 | Wakako et al. ................. | 725/135 |
| 2006/0274053 | A1 * | 12/2006 | Kinouchi ....................... | 345/173 |
| 2007/0075985 | A1 * | 4/2007 | Niida ............................. | 345/173 |
| 2007/0130547 | A1 * | 6/2007 | Boillot .......................... | 715/863 |
| 2007/0150720 | A1 * | 6/2007 | Oh et al. ........................ | 713/153 |
| 2007/0211023 | A1 * | 9/2007 | Boillot .......................... | 345/156 |
| 2008/0198275 | A1 * | 8/2008 | Kinouchi ....................... | 348/738 |
| 2008/0220828 | A1 * | 9/2008 | Jensen .......................... | 455/574 |
| 2010/0115455 | A1 * | 5/2010 | Kim .............................. | 715/781 |
| 2010/0134312 | A1 * | 6/2010 | Park et al. ..................... | 340/689 |
| 2010/0177037 | A1 * | 7/2010 | Kim et al. ..................... | 345/156 |
| 2011/0053641 | A1 * | 3/2011 | Lee et al. .................... | 455/556.1 |
| 2011/0148752 | A1 * | 6/2011 | Alameh et al. ................ | 345/156 |

(Continued)

FOREIGN PATENT DOCUMENTS

JP      3918813     2/2007

*Primary Examiner* — Lashonda Jacobs
(74) *Attorney, Agent, or Firm* — Sherr & Jiang, PLLC

(57) ABSTRACT

There is provided an information processing device including a movement detection unit configured to detect a specific operation, and a process execution unit configured to, when the movement detection unit detects the specific operation, execute a process in accordance with the specific operation. In a case in which the movement detection unit has detected a first specific operation and the process execution unit has executed a first process in accordance with the first specific operation, if the movement detection unit further continuously detects the first specific operation, the process execution unit executes a second process that is continuous with the first process, and if the movement detection unit detects a second specific operation meaning a cancellation of the first process, the process execution unit executes a third process that cancels the first process.

12 Claims, 12 Drawing Sheets

(56) References Cited

U.S. PATENT DOCUMENTS

| | | | |
|---|---|---|---|
| 2012/0136529 A1* | 5/2012 | Curtis et al. | 701/32.2 |
| 2013/0234970 A1* | 9/2013 | Hodges et al. | 345/173 |
| 2013/0344862 A1* | 12/2013 | Alameh et al. | 455/418 |

* cited by examiner

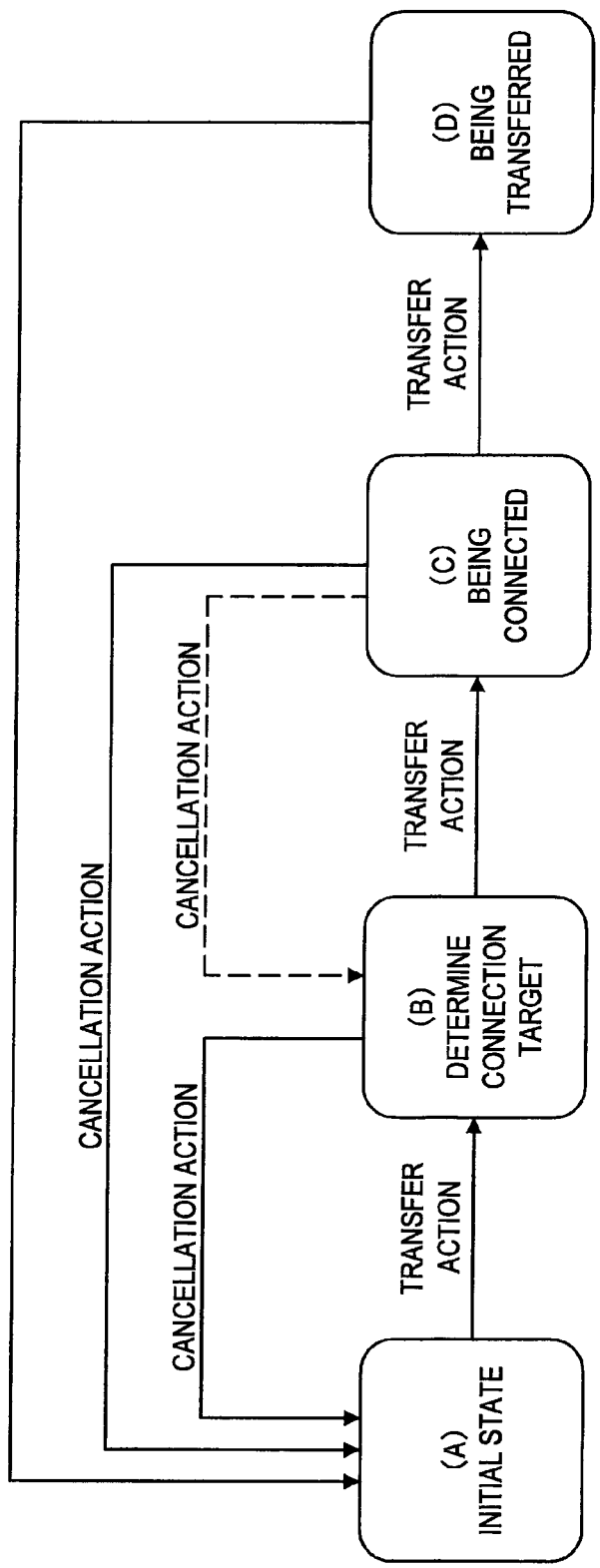

INFORMATION PROCESSING DEVICE, INFORMATION PROCESSING METHOD, AND COMPUTER PROGRAM

BACKGROUND

The present disclosure relates to an information processing device, an information processing method, and a computer program.

In recent years, personal computers having wireless communication functions as well as compact portable terminals having wireless communication functions have come into widespread use. As the personal computers having wireless communication functions and compact portable terminals have come into widespread use, opportunities to transfer images or document data between devices have also increased. For example, the following usage has become more common nowadays: an image captured with a compact portable terminal is transferred to a personal computer so that the image is displayed on the personal computer or a digital photo frame, or the image is uploaded to the Internet from the personal computer or the digital photo frame.

For transferring data, typically, a method, which includes selecting a target device from a candidate list of transfer destinations displayed on the screen, is often adopted. However, with this method, it would be difficult to grasp the correspondence between the name or image displayed on the screen and the actual device. In order to transfer data by establishing wireless communication between devices, it is required that the transfer destination can be easily designated by the transfer source without the need for difficult setting, so that data can be transferred from the transfer source to the transfer destination. As such a technique, a technique disclosed in JP 3918813B is known.

SUMMARY

The technique disclosed in JP 3918813B allows a user to intuitively designate a connection target by using a physical signal such as the inter-device positional relationship, time information, or sensor information. However, this technique is only based on estimation, and there have been possibilities that a transfer destination may not be identified or a connection with an erroneous target may be established. Therefore, a method has been demanded that can execute a process in accordance with an operation of a user, and can easily cancel, by another operation of the user, the process performed immediately before that.

In light of the foregoing, it is desirable to provide an information processing device, an information processing method, and a computer program that are novel and improved and that can execute, upon detecting an operation of a user, a process in accordance with the operation, and can, upon detecting another operation of the user, cancel the process that has been performed immediately before that.

According to an embodiment of the present disclosure, there is provided an information processing device including a movement detection unit configured to detect a specific operation, and a process execution unit configured to, when the movement detection unit detects the specific operation, execute a process in accordance with the specific operation. In a case in which the movement detection unit has detected a first specific operation and the process execution unit has executed a first process in accordance with the first specific operation, if the movement detection unit further continuously detects the first specific operation, the process execution unit executes a second process that is continuous with the first process, and if the movement detection unit detects a second specific operation meaning a cancellation of the first process, the process execution unit executes a third process that cancels the first process.

According to the present disclosure, when the movement detection detects the specific operation, the process execution unit executes a process in accordance with the specific operation. Then, in a case in which the movement detection unit has detected a first specific operation and the process execution unit has executed a first process in accordance with the first specific operation, if the movement detection unit further continuously detects the first specific operation, the process execution unit executes a second process that is continuous with the first process. Meanwhile, if the movement detection unit detects a second specific operation meaning a cancellation of the first process, the process execution unit executes a third process that cancels the first process.

According to another embodiment of the present disclosure, there is provided a information processing method including a movement detection step of detecting a specific operation, a first process execution step of, when the movement detection step detects the specific operation, executing a process in accordance with the specific operation, a second process execution step of, in a case in which the movement detection step has detected a first specific operation and the first process execution step has executed a first process in accordance with the first specific operation, if the movement detection step further continuously detects the first specific operation, executing a second process that is continuous with the first process, and a third process execution step of, in a case in which the movement detection step has detected a first specific operation and the first process execution step has executed a first process in accordance with the first specific operation, if the movement detection step detects a second specific operation meaning a cancellation of the first process, executing a third process of cancelling the first process.

According to yet another embodiment of the present disclosure, there is provided a computer program for causing a computer to execute a movement detection step of detecting a specific operation, a first process execution step of, when the movement detection step detects the specific operation, executing a process in accordance with the specific operation, a second process execution step of, in a case in which the movement detection step has detected a first specific operation and the first process execution step has executed a first process in accordance with the first specific operation, if the movement detection step further continuously detects the first specific operation, executing a second process that is continuous with the first process, and a third process execution step of, in a case in which the movement detection step has detected a first specific operation and the first process execution step has executed a first process in accordance with the first specific operation, if the movement detection step detects a second specific operation meaning a cancellation of the first process, executing a third process of cancelling the first process.

As described above, the present disclosure can provide an information processing device, an information processing method, and a computer program that are novel and improved and that can execute, upon detecting an operation of a user, a process in accordance with the operation, and can, upon detecting another operation of the user, cancel the process that has been performed immediately before that.

BRIEF DESCRIPTION OF THE DRAWINGS

FIG. 12 is an explanatory diagram showing an overview of a variation of the operation of the information processing system 1 in accordance with an embodiment of the present disclosure.

DETAILED DESCRIPTION OF THE EMBODIMENTS

Figure 1:
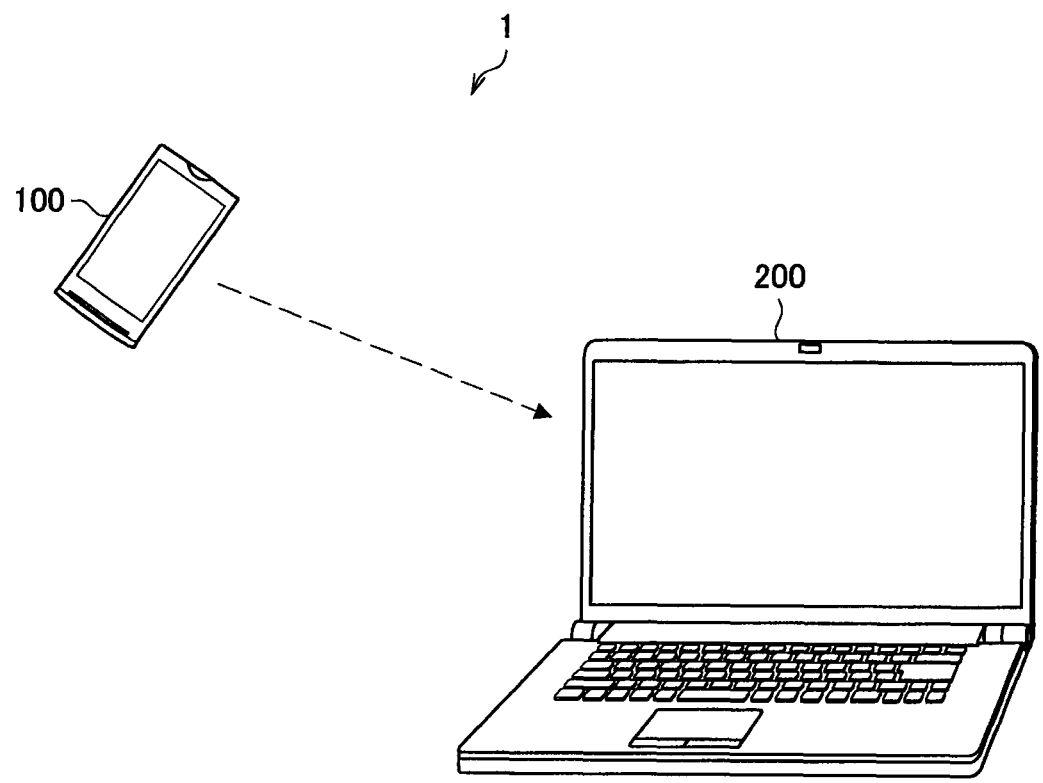
FIG. 1 is an explanatory diagram showing the overall configuration of an information processing system 1 in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

<1. Embodiment of the Present Disclosure>
[1-1. Configuration of Information Processing System]
[1-2. Functional Configuration of Portable Terminal]
[1-3. Functional Configuration of Personal Computer]
[1-4. Operation of Information Processing System]
<2. Conclusion>
<1. Embodiment of the Present Disclosure>
[1-1. Configuration of Information Processing System]

First, the configuration of an information processing system in accordance with an embodiment of the present disclosure will be described with reference to the drawings. FIG. 1 is an explanatory diagram showing the configuration of an information processing system 1 in accordance with an embodiment of the present disclosure. Hereinafter, the configuration of the information processing system 1 in accordance with an embodiment of the present disclosure will be described with reference to FIG. 1.

As shown in FIG. 1, the information processing system 1 in accordance with an embodiment of the present disclosure includes a portable terminal 100 and a personal computer 200.

The portable terminal 100 is a compact electronic device that can be carried about, such as a portable phone or a PDA terminal, for example. In this embodiment, the portable terminal 100 has a function of executing wireless communication on the basis of the short-range wireless communication standard for digital devices. With such a wireless communication function, the portable terminal 100 can transmit image data, document data, or other types of electronic data to the personal computer 200 shown in FIG. 1.

The personal computer 200 is a terminal that executes various information processing in accordance with user operations. In this embodiment, the personal computer 200 has, like the portable terminal 100, a function of executing wireless communication on the basis of the short-range wireless communication standard for digital devices. In addition, the personal computer 200 can receive image data, document data, or other types of electronic data from the portable terminal 100 via the wireless communication.

Although FIG. 1 shows the personal computer 200 as a laptop personal computer, it is needless to mention that the present disclosure is not limited to such example as long as the personal computer 200 is a device that has a function of executing wireless communication on the basis of the short-range wireless communication standard for digital devices, and can receive image data, document data, or other types of electronic data from the portable terminal 100. In addition, although FIG. 1 shows only the portable terminal 10 and the personal computer 200, the information processing system 1 can include other electronic devices such as a digital photo frame, for example, as described below.

The configuration of the information processing system 1 in accordance with an embodiment of the present disclosure has been described above with reference to FIG. 1. Next, the functional configuration of the portable terminal 100 in accordance with an embodiment of the present disclosure will be described.

[1-2. Functional Configuration of Portable Terminal]

Figure 2:
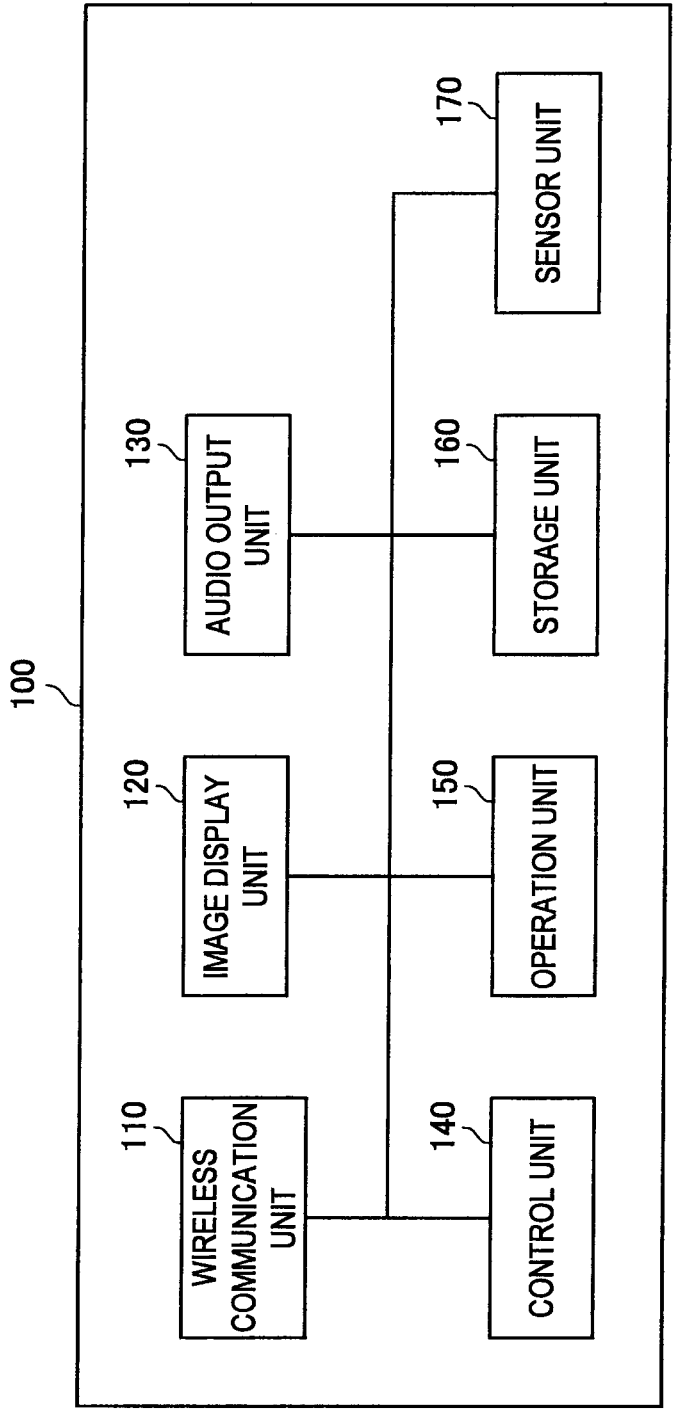
FIG. 2 is an explanatory diagram showing the functional configuration of a portable terminal 100 in accordance with an embodiment of the present disclosure.

FIG. 2 is an explanatory diagram showing the functional configuration of the portable terminal 100 in accordance with an embodiment of the present disclosure. Hereinafter, the functional configuration of the portable terminal 100 in accordance with an embodiment of the present disclosure will be described with reference to FIG. 2.

As shown in FIG. 2, the portable terminal 100 in accordance with an embodiment of the present disclosure includes a wireless communication unit 110, an image display unit 120, an audio output unit 130, a control unit 140, an operation unit 150, a storage unit 160, and a sensor unit 170.

The wireless communication unit 110 executes wireless communication on the basis of the short-range wireless communication standard for digital devices. In this embodiment, the wireless communication unit 110, under the control of the control unit 140, transmits image data, document data, or other types of electronic data stored in the storage unit 160 to a transmission destination device designated in advance. The process of designating the transmission destination of electronic data, and the process of transmitting the electronic data to the designated transmission destination with the portable device 100 are described in detail below.

The image display unit 120 displays an image. The image display unit 120 is a liquid crystal display or an organic EL display, for example, and is configured to display an image on the basis of a predetermined image signal.

The audio output unit 130 outputs audio. The audio output unit 130 includes a speaker or earphones, for example, and is configured to output audio on the basis of a predetermined audio signal.

The control unit 140 controls the operation of the portable terminal 100. Specifically, the control unit 140 controls wireless communication of the wireless communication unit 110, image display of the image display unit 120, audio output of the audio output unit 130, and the like. The control unit 140 includes a CPU (Central Processing Unit), for example.

The operation unit 150 receives an operation of a user of the portable terminal 100. The operation unit 150 may include various buttons or sensors to operate the portable terminal 100. In addition, the operation unit 150 may include a touch panel integrated with the image display unit 120. The control unit 140 controls the operation of the portable terminal 100 on the basis of a user operation on the operation unit 150.

The storage unit 160 stores computer programs, image data, document data, or other types of electronic data for operating the portable terminal 100. The computer programs for operating the portable terminal 100 stored in the storage unit 160 are sequentially read and executed by the control unit 140. In addition, the image data, document data, or other types of electronic data stored in the storage unit 160 are, once the user of the portable terminal 100 executes a predetermined operation on the portable terminal 100, transmitted from the wireless communication unit 110 on the basis of the operation.

The sensor unit 170 detects a movement of the portable terminal 100, and includes, for example, a gyro sensor or an accelerometer. When a movement of the portable terminal 100 is detected by the sensor unit 170, the control unit 140 detects what kind of movement of the portable terminal 100 the sensor unit 170 has detected. The control unit 140 executes an operation based on the movement of the portable terminal 100.

Figure 3:
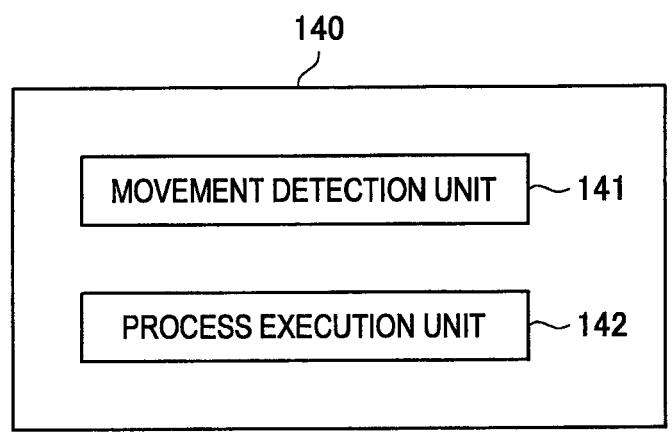
FIG. 3 is an explanatory diagram showing the functional configuration of a control unit 140 in accordance with an embodiment of the present disclosure.

Herein, the functional configuration of the control unit 140 will be described in detail. FIG. 3 is an explanatory diagram showing the functional configuration of the control unit 140 in accordance with an embodiment of the present disclosure. As shown in FIG. 3, the control unit 140 in accordance with an embodiment of the present disclosure includes a movement detection unit 141 and a process execution unit 142.

The movement detection unit 141, upon receiving the movement of the portable terminal 100 detected by the sensor unit 170, detects how the portable terminal 100 has been moved by the user. The movement detection unit 141 can detect movements of a plurality of specific patterns. The movement detection unit 141, upon detecting a movement of a specific pattern, informs the process execution unit 142 of the information about the detected movement.

The process execution unit 142 executes a process in accordance with the information about the movement of the specific pattern detected by the movement detection unit 141. As described above, as the movement detection unit 141 can detect movements of a plurality of specific patterns, the process execution unit 142 also executes a plurality of processes in accordance with the information about the movements of the specific patterns. In addition, the process execution unit 142 executes, even for information about an identical movement, different processes according to the operation state of the portable terminal 100.

For example, when the movement detection unit 141 detects a movement of the portable terminal 100 shaken vertically by the user of the portable terminal 100 as a movement of a specific pattern, the process execution unit 142 executes a specific process in accordance with such movement and on the basis of the operation state of the portable terminal 100. Information about a movement of a specific pattern, and information about a specific process that is based on the movement and the operation state of the portable terminal 100 are described in detail below.

The control unit 140 can have a functional configuration such as the one shown in FIG. 3 by, for example, reading the computer program stored in the storage unit 160 and executing the read computer program.

The functional configuration of the portable terminal 100 in accordance with an embodiment of the present disclosure has been described. Next, the configuration of the personal computer 100 in accordance with an embodiment of the present disclosure will be described.

[1-3. Functional Configuration of Personal Computer]

Figure 4:
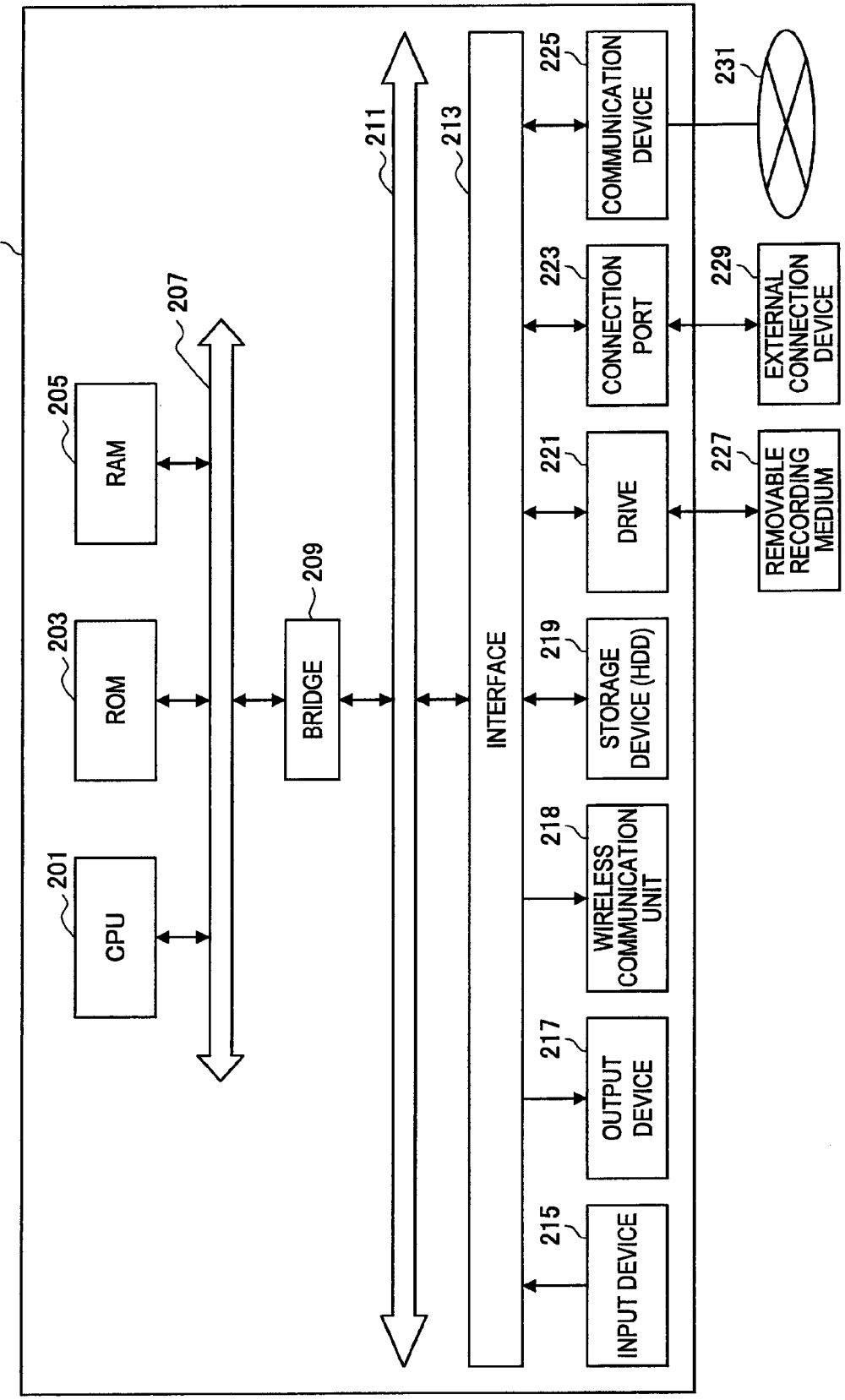
FIG. 4 is a block diagram illustrating the hardware configuration of a personal computer 200 in accordance with an embodiment of the present disclosure.

FIG. 4 is a block diagram illustrating the hardware configuration of the personal computer 200 in accordance with an embodiment of the present disclosure. Hereinafter, the configuration of the personal computer 200 in accordance with an embodiment of the present disclosure will be described with reference to FIG. 4.

The personal computer 200 mainly includes a CPU 201, ROM 203, RAM 205, a host bus 207, a bridge 209, an external bus 211, an interface 213, an input device 215, an output device 217, a wireless communication device 218, a storage device 219, a drive 212, a connection port 223, and a communication device 225.

The CPU 201 functions as an arithmetic processing unit and a control unit, and controls the entire operation of or part thereof within the personal computer 200 in accordance with various programs recorded on the ROM 203, the RAM 205, the storage device 219, or the removable recording medium 227. The ROM 203 stores programs, operation parameters, and the like used by the CPU 201. The RAM 205 temporarily stores programs used in the execution of the CPU 201, parameters that change as appropriate during the execution, and the like. These units are mutually connected via the host bus 204 including a CPU bus or the like.

The host bus 207 is connected to the external bus 211 such as a PCI (Peripheral Component Interconnect/Interface) bus via the bridge 209.

The input device 215 is an operation means operated by a user, such as a mouse, a keyboard, a touch panel, a button, a switch, or a lever. The input device 215 may be a remote control means (a so-called remote controller) that uses infrared rays or other radio waves, for example, or an external connection device 229 such as a portable phone or a PDA corresponding to an operation of the personal computer 200. Further, the input device 215 includes, for example, an input control circuit that generates an input signal on the basis of information input by a user using the aforementioned operation means, and outputs the signal to the CPU 201. A user of the personal computer 200 can, by operating the input device 215, input various data to the personal computer 200 or instruct the personal computer 200 to perform a processing operation.

The output device 217 includes a display device such as, for example, a CRT display device, a liquid crystal display device, a plasma display device, an EL display device, or a lamp; an audio output device such as a speaker or headphones; or a device that can visually or audibly inform a user of the acquired information, such as a printer device, a portable phone, or a facsimile. The output device 217, for example, outputs a result obtained by performing various processes with the personal computer 200. Specifically, the display device displays a result obtained by performing various processes with the personal computer 200 by means of text or images. Meanwhile, the audio output device converts and output san audio signal, composed of played sound data or audio data, into an analog signal.

The storage device 219 is a device for storing data, constructed as an example of a storage unit of the personal computer 200. The storage device 219 includes a magnetic memory device such as a HDD (Hard Disk Drive), a semiconductor memory device, an optical memory device, or a magnetooptical memory device. This storage device 219 stores programs and various data executed by the CPU 201, audio signal data or image signal data acquired from the outside, or the like.

The drive 221 is a reader/writer for a recording medium, and is built in or externally attached to the personal computer 200. The drive 221 reads information recorded on the removable recording medium 227 such as a magnetic disk, an optical disc, a magnetooptical disk, or semiconductor memory that is mounted, and outputs the read information to the RAM 205. The drive 220 can also write information to the removable recording medium 227 such as an optical disc, a magnetooptical disk, or semiconductor memory that is mounted. Examples of the removable recording medium 227 include a DVD medium, a Blu-ray medium, CompactFlash® (CF), a memory stick, or an SD memory card (Secure Digital memory card). Alternatively, the removable recording medium 227 may be an IC card (Integrated Circuit card) with a wireless IC chip mounted thereon or an electronic device, for example.

The connection port 223 is a port for directly connecting the device to the personal computer 200, such as, for example, a USB (Universal Serial Bus) port, an IEEE 1394 port such as i.Link, SCSI (Small Computer System Interface) port, an RS-232C port, an optical audio terminal, or an HDMI (High-Definition Multimedia Interface) port. When the external connection device 229 is connected to the connection port 223, the personal computer 200 directly acquires audio signal data or image signal data from the external connection device 229, or provides audio signal data or image signal data to the external connection device 229.

The communication device 225 is, for example, a communication interface including a communication device or the like for connection to a communications network 231. The communication device 225 is, for example, a wired or wireless LAN (Local Area Network), a communication card for Bluetooth or WUSB (for wireless USB), a router for optical communication, a router for ADSL (Asymmetric Digital Subscriber Line), or a modem for various communication. The communication device 225 can, for example, transfer signals via the Internet or with another communication device in accordance with a predetermined protocol such as TCP/IP, for example. In addition, the communications network 231 connected to the communication device 225 includes a network connected by wire or wirelessly, and may be, for example, the Internet, a home LAN, infrared communication, radio wave communication, or satellite communication.

The configuration of the personal computer 200 in accordance with an embodiment of the present disclosure has been described above. Next, the operation of the information processing system 1 in accordance with an embodiment of the present disclosure will be described.

[1-4. Operation of Information Processing System]

Figure 5:
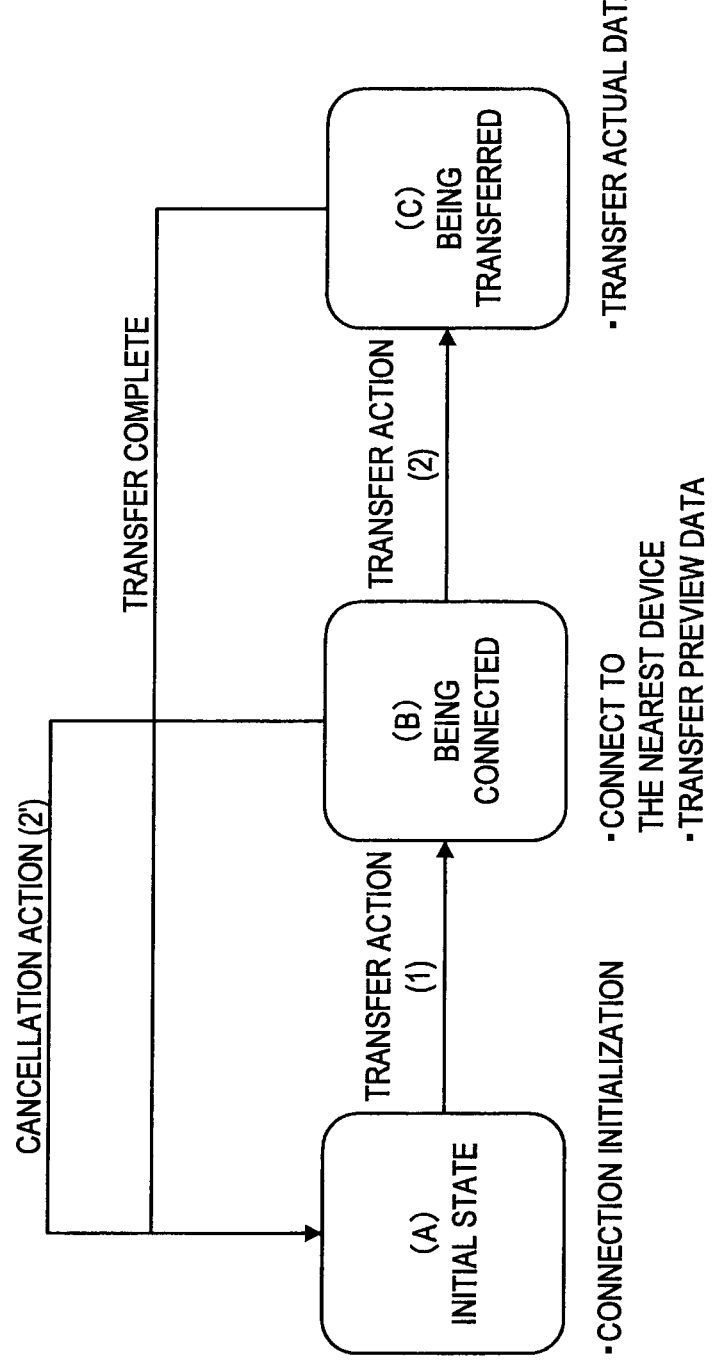
FIG. 5 is an explanatory diagram showing an overview of the operation of the information processing system 1 in accordance with an embodiment of the present disclosure.

First, an overview of the operation of the information processing system 1 in accordance with an embodiment of the present disclosure will be described. FIG. 5 is an explanatory diagram showing an overview of the operation of the information processing system 1 in accordance with an embodiment of the present disclosure. Herein, an operation performed when the portable terminal device 100 transmits image data, document data, or other types of electronic data to the personal computer 200 will be described. Hereinafter, an overview of the operation of the information processing system 1 in accordance with an embodiment of the present disclosure will be described with reference to FIG. 5.

When the portable terminal 100 transmits image data, document data, or other types of electronic data to the personal computer 200, the portable terminal 100 and the personal computer 200 are first in the "(A) initial state." This initial state is a connection initialization state in which a connection between the portable terminal 100 and the personal computer 200 is not established yet. The portable terminal 100 should identify a target device to transmit data to with some method.

In this embodiment, in this initial state, a user of the portable terminal 100 executes a specific transfer action near a target device (the personal computer 200) to transfer electronic data to while holding the portable terminal 100, whereby the portable terminal 100 detects the transfer action and establishes a connection with the personal computer 200. Such a state will be referred to as a "(B) connected state."

The transfer action herein may be, for example, an action of the user of the portable terminal 100 to hold the potable terminal 10 upside down and vertically shake the portable device 100 near a target device (the personal computer 200) to transfer electronic data to several times. The action of the user of the portable terminal 100 to hold the portable terminal 100 upside down and vertically shake it can be detected by a sensor of the sensor unit 170, and the number of shakes can be detected by the movement detection unit 141.

When the user of the portable terminal 100 holds the portable terminal 100 and executes a specific transfer action near a target device (the personal computer 200) to transfer electronic data to, a connection with the personal computer 200 is established. It is needless to mention that the connection between the portable terminal 100 and the personal computer 200 is established on the basis of the communication standard for wireless communication devices of the portable terminal 100 and the personal computer 200, and is not limited to a specific method.

The portable terminal 100, in addition to establishing a connection with the personal computer 200, transfers preview data of the electronic data to be transferred (e.g., if the electronic data is image data, thumbnail data of the image data) to the personal computer 200. The personal computer 200 outputs the transferred preview data to the output device 217. Accordingly, the user of the portable terminal 100 can visually perceive and check if the device connected by a specific transfer action is the target device to transfer electronic data to.

In the connected state, the user of the portable terminal 100 executes a specific transfer action near the target device (the personal computer 200) to transfer electronic data to while holding the portable terminal 100, whereby the portable terminal 100 detects the transfer action, and transfers to the personal computer 200 the actual data of the electronic data to be transferred. Such a state will be referred to as a "(C) transferred state." In this embodiment, the specific action herein is an action that is identical to the action of transitioning state from the initial state to the connected state.

Meanwhile, in the connected state, when the user of the portable terminal 100 executes a specific cancellation action while holding the portable terminal 100, the portable terminal 100 detects the cancellation action with the movement detection unit 141, and instructs the personal computer 200 to delete the transferred preview data, from the process execution unit 142.

The cancellation action may be, for example, an action of the user of the portable terminal 100 to change the orientation of the portable terminal 100 by rotating the portable terminal 100 by 180 degrees. Before the cancelation, the user of the portable terminal 100 has been executing an operation of shaking the portable terminal 100 several times while holding it upside down. Thus, rotating the portable terminal 100 by 180 degrees means restoring the orientation of the portable terminal 100 back to the original orientation. The instructed personal computer 200 deletes the preview data, which has been output to the output device 217, from the output device 217. Then, the portable terminal 100 and the personal computer 200 cancel the established connection, and restore the state back to the original state.

As described above, when the portable terminal 100 detects an action of a user on the portable terminal 100 and executes the detected action in accordance with the current state, it becomes possible to allow the user to easily perform operations of determining the transfer destination of the data, transfer the data, and reset the transfer destination of the data. In addition, when an action on the portable terminal 100 is set as an action for recalling an operation to be executed, it becomes possible to provide an intuitive operation for executing a predetermined process to the user of the portable terminal 100.

An overview of the operation of the information processing system 1 in accordance with an embodiment of the present disclosure has been described above with reference to FIG. 5. Next, the details of the operation of the information processing system 1 in accordance with an embodiment of the present disclosure will be described.

Figure 6:
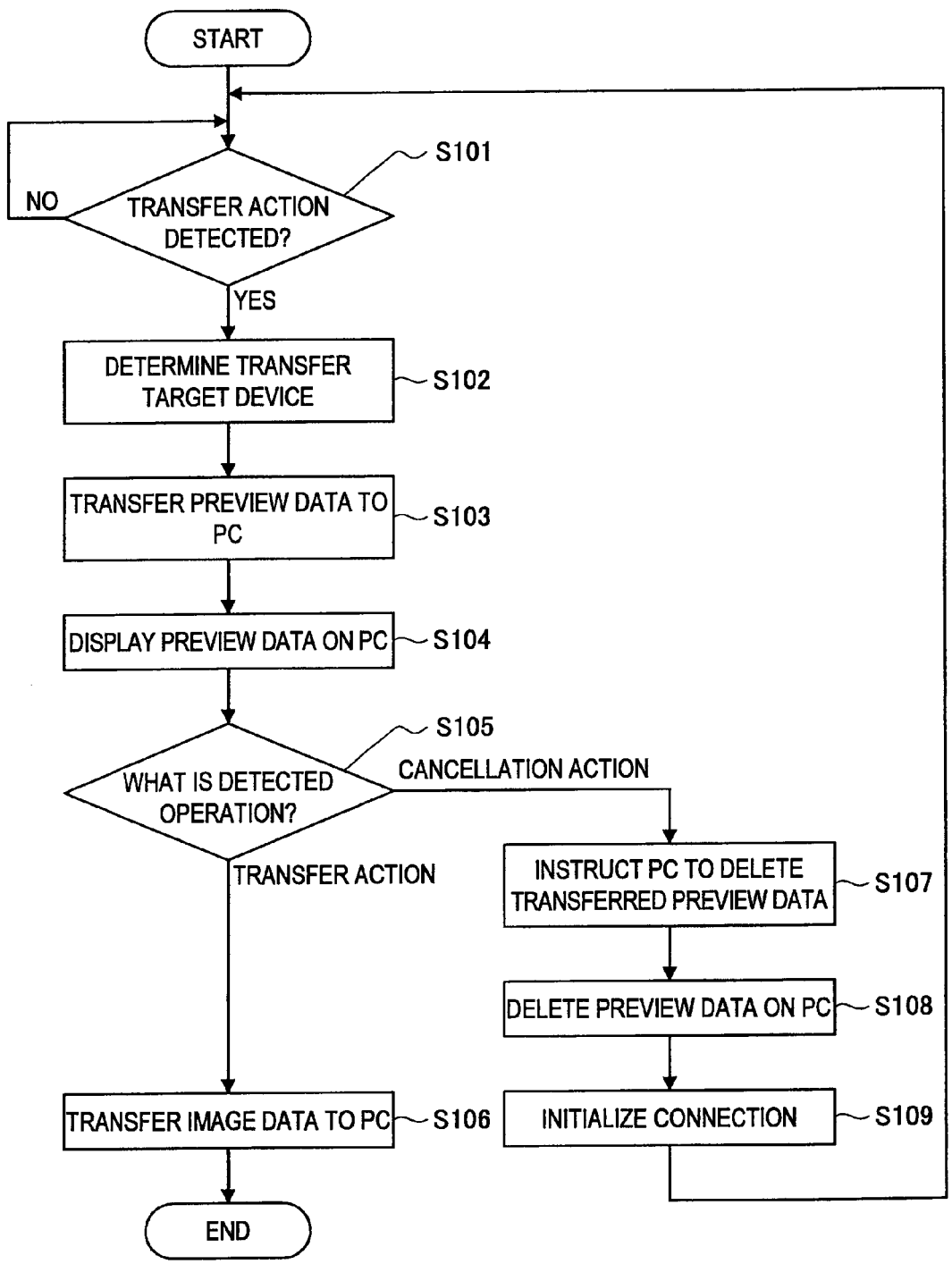
FIG. 6 is a flowchart showing the details of the operation of the information processing system 1 in accordance with an embodiment of the present disclosure.

FIG. 6 is a flowchart showing the details of the operation of the information processing system 1 in accordance with an embodiment of the present disclosure. Herein, as in FIG. 5, an operation of transferring image data, document data, or other types of electronic data from the portable terminal 100 to the personal computer 200 will be described. Note that the data to be transferred from the portable terminal 100 to the personal computer 200 is determined in advance by the user of the portable terminal 100. Hereinafter, the details of the operation of the information processing system 1 in accordance with an embodiment of the present disclosure will be described with reference to FIG. 6.

First, the movement detection unit 141 detects if the user of the portable terminal 100 has executed a predetermined transfer action while holding the portable terminal 100 (step S101). When the movement detection unit 141 detects that the user of the portable terminal 100 has executed a predetermined transfer action while holding the portable terminal 100, the portable terminal 100 determines a target device to transfer data to (step S102). This determination is executed by the process execution unit 142, for example. Accordingly, the portable terminal 100 and the personal computer 200 transition state from the initial state to the connected state.

The target device to transfer data to can be determined using various methods. In this embodiment, the target device to transfer data to is determined as follows. First, the process execution unit 142, in order to determine a candidate device to connect to, searches for devices existing around the portable terminal 100 using service discovery of wireless communication or the like. When only a single device is found as a result of the search, the process execution unit 142 determines the device as the target device to transfer data to. When a plurality of candidates are found as a result of the search, the process execution unit 142 further identifies a device estimated to be the nearest using additional sensor information such as radio field intensity. The process execution unit 142 executes a connection with the thus determined transfer target device using radio communication.

The portable terminal 100 transfers preview data of the data to be transferred (if the electronic data is image data, thumbnail data of the image data) to the personal computer 200, which is the transfer target device, from the wireless communication unit 110 (step S103). In this case, the process execution unit 142 instructs the personal computer 200, which is the transfer target device, to output the received thumbnail to the output unit 217. The personal computer 200 receives, with the wireless communication device 218, the preview data wirelessly transmitted from the portable terminal 100, and outputs the received preview data to the output unit 217 (step S104).

Next, the movement detection unit 141 detects what kind of action the user of the portable terminal 100 has executed while holding the portable terminal 100 (step S105).

When the action detected by the movement detection unit 141 in step S105 above is a transfer action, the process execution unit 142 causes the wireless communication unit 110 to wirelessly transmit to the personal computer 200 the data to be transferred from the portable terminal 100 (step S106). The personal computer 200 receives, with the wireless communication device 218, the data wirelessly transmitted from the portable terminal 100. Accordingly, transfer of electronic data from the portable terminal 100 to the personal computer 200 is completed.

Meanwhile, when the action detected by the movement detection unit 141 in step S105 above is a cancellation action, the process execution unit 142 instructs the personal computer 200, which is the transfer target device, to delete the preview data transferred in step S103 above, from the wireless communication unit 110 (step S107). The personal computer 200 instructed by the portable terminal 100 deletes the preview data, which has been received with the wireless communication device 218 and output to the output unit 217, from the screen, and also deletes the preview data in the personal computer 200 (step S108). Then, the portable terminal 100 and the personal computer 200 cancel the mutual connection, and transition state to the connection initialization state (step S109).

As described above, when the portable terminal 100 detects an action of the user on the portable terminal 100 and executes the detected action in accordance with the current state, it becomes possible to allow the user to easily perform operations of determining the transfer destination of the data, transfer the data, and reset the transfer destination of the data.

Figure 7:
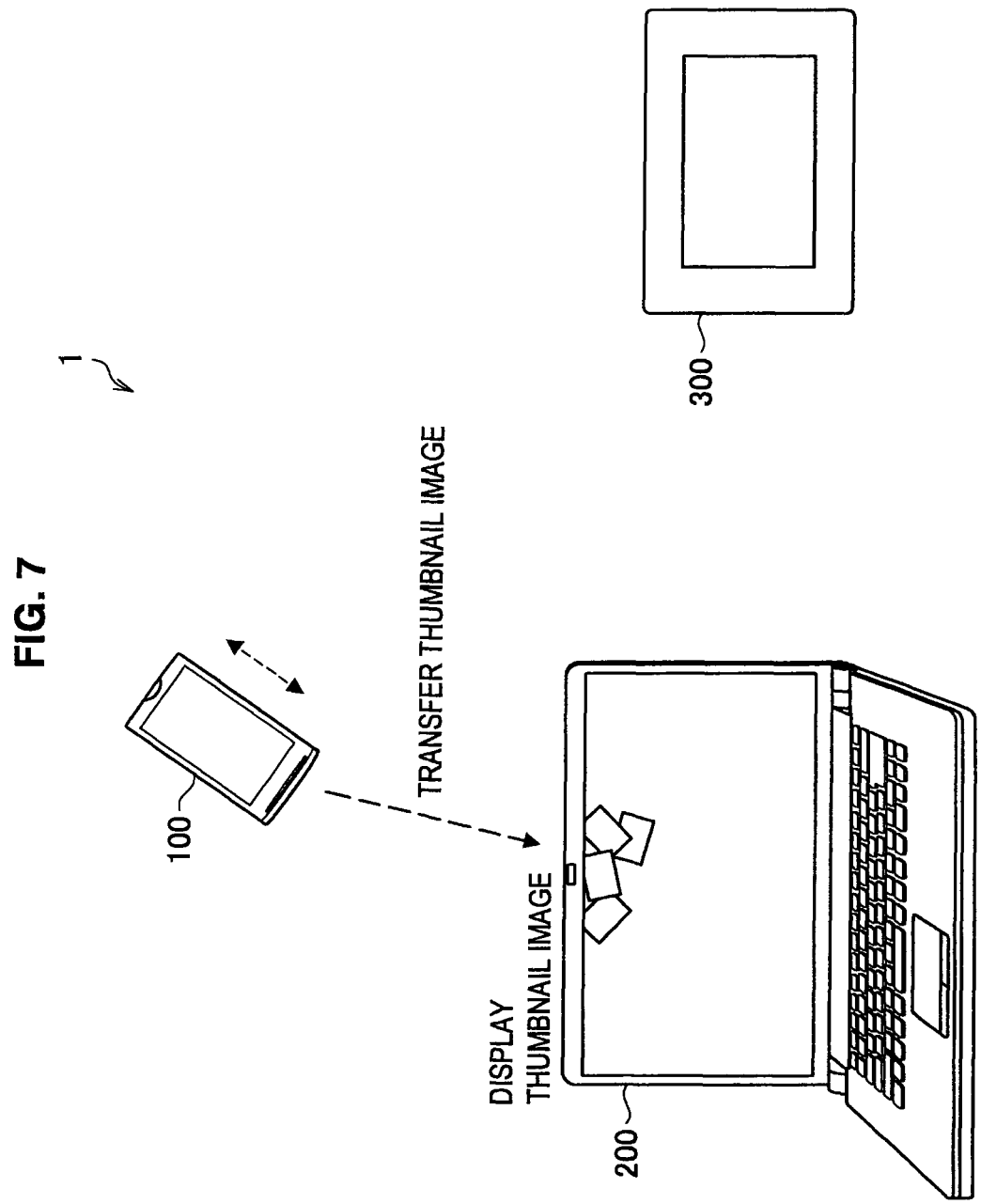
FIG. 7 is an explanatory diagram showing a view in which a user of the portable terminal 100 executes a transfer action in the initial state.

FIG. 7 is an explanatory diagram showing a view in which the user of the portable terminal 100 executes a transfer action in the initial state. In FIG. 7, in addition to the personal computer 200, the digital photo frame 300 is also shown as a candidate of the transfer target device.

When the user of the portable terminal 100 executes a transfer action in the initial state, the process execution unit 142 determines a transfer target device. Then, as a result of the process of determining the transfer target device, the personal computer 200 is determined as the transfer destination, and preview data is transferred from the portable terminal 100 to the personal computer 200. In the drawing, a view in which the personal computer 200 displays the preview data is shown.

FIG. 7 also shows an exemplary user interface of the personal computer 200 when the preview data is displayed. Herein, thumbnails are caused to appear using animations that appear at the beginning at the upper portion of the screen from the outside, whereby an impression that data fell from the portable terminal 100, which is spatially located above the personal computer 200, is given to the user, promoting the user to understand the circumstance. In addition, pieces of the preview data are collectively displayed around the upper portion of the screen, giving an impression that photographs have got struck with something, which indicates that the transfer process is not completed yet.

Figure 8:
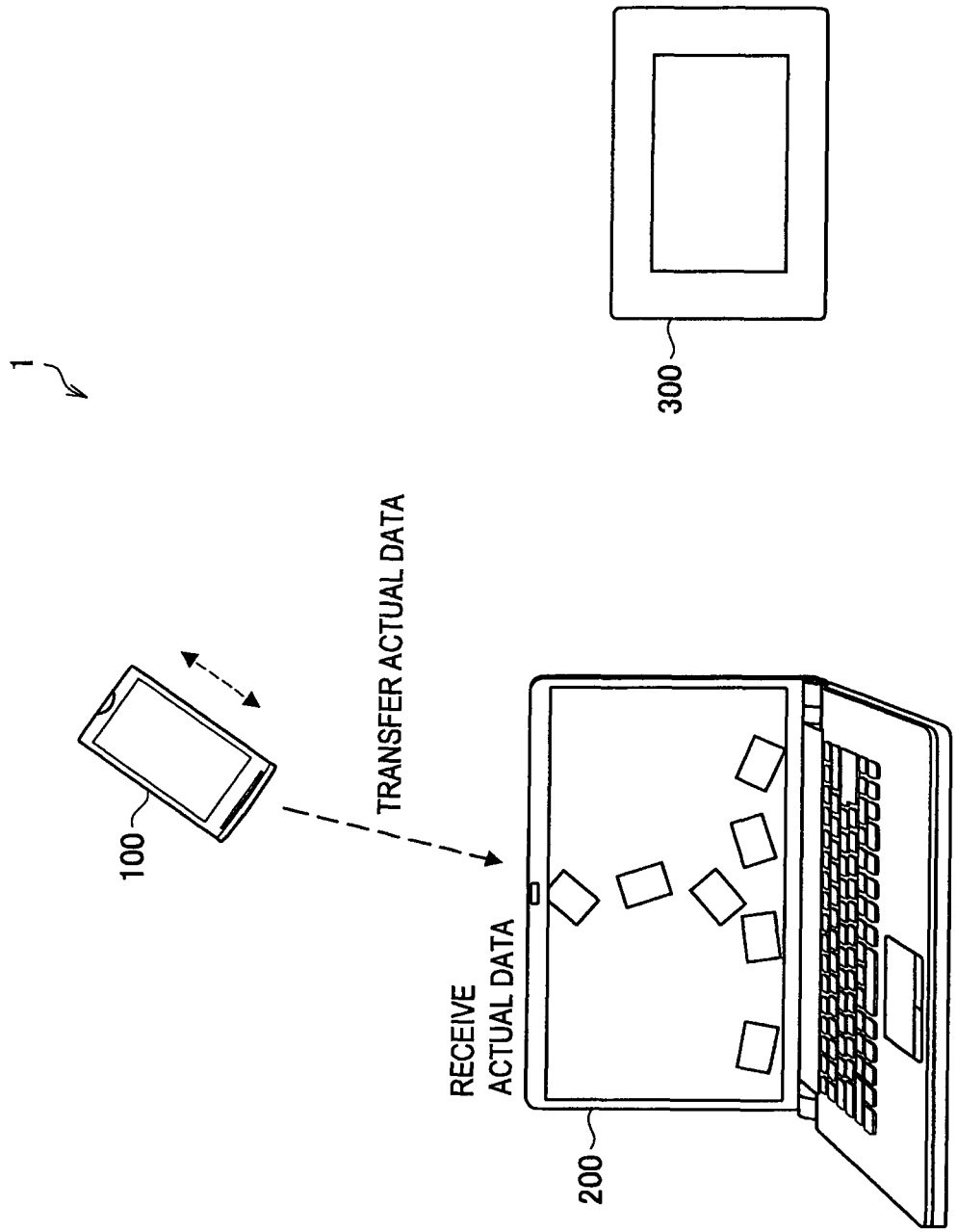
FIG. 8 is an explanatory diagram showing a view in which a user of the portable terminal 100 executes a transfer action in the connected state.

FIG. 8 is an explanatory diagram showing a view in which the user of the portable terminal 100 executes a transfer action in the connected state. The user of the portable terminal 100, upon confirming that the transfer destination of the data is correct, executes again a transfer action while holding the portable terminal 100. Accordingly, the actual electronic data is transmitted to the personal computer 200 determined as the transfer destination.

FIG. 8 also shows an example of the user interface of the personal computer 200 when electronic data is transferred from the portable terminal 100 to the personal computer 200. In FIG. 8, photographs, which have got struck with the upper portion of the screen as shown in FIG. 7, fall downward when the user shakes the portable terminal 100, whereby the user is informed that the transfer has started. Preview data that has been successfully transferred is deleted from the output unit 217 as needed.

Figure 9:
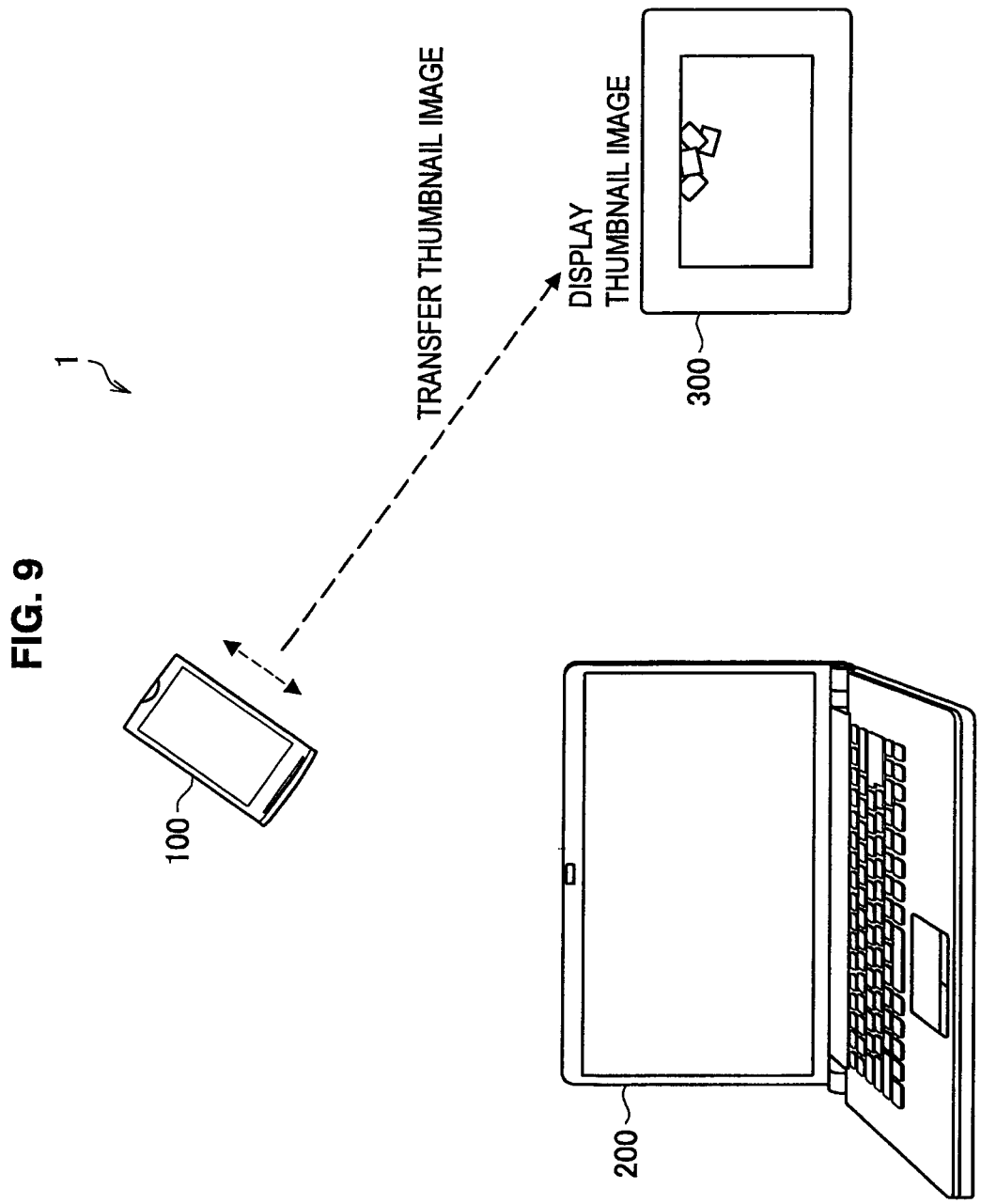
FIG. 9 is an explanatory diagram showing a view in which preview data is displayed on a device that is not the transfer destination intended by a user.

However, there may be cases in which, for some reason, a connection target device cannot be estimated accurately in the first transfer action, and preview data is displayed on a device that is not the transfer destination intended by the user. FIG. 9 is an explanatory diagram showing a view in which preview data is displayed on the digital photo frame 300 that is not the transfer destination intended by the user.

Figure 10:
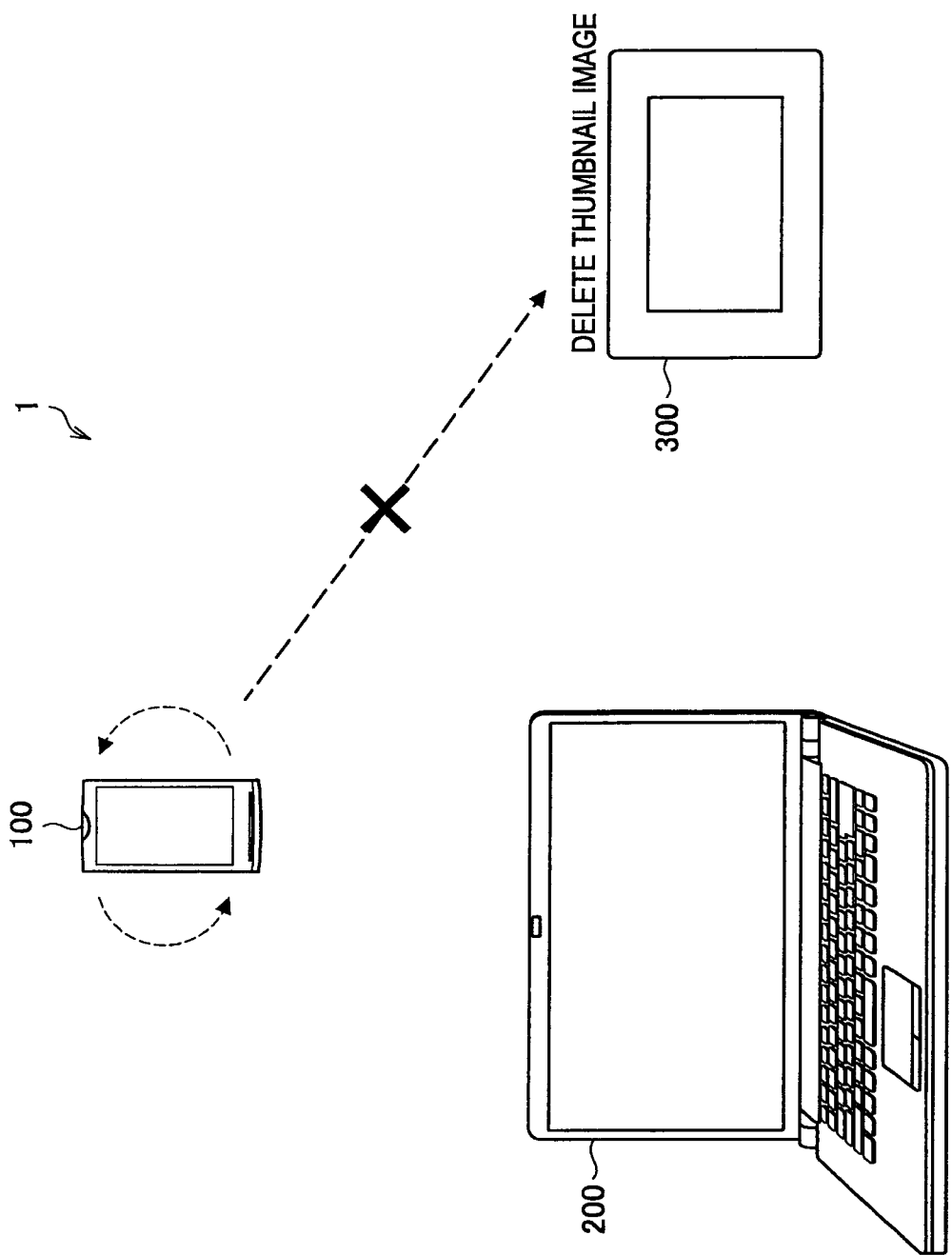
FIG. 10 is an explanatory diagram showing a view in which a user of the portable terminal 100 executes a cancellation action in the connected state.

Herein, when the user of the portable terminal 100 executes a cancellation action (an operation of restoring the orientation of the portable terminal 100, which has been held upside down, to the original orientation), the portable terminal 100 detects the cancellation action, and the connection established between the portable terminal 100 and the digital photo frame 300 is disconnected. Then, the preview data that has been once transferred to the transfer destination, which is not intended by the user, is deleted from the digital photo frame 300. FIG. 10 is an explanatory diagram showing a view in which the user of the portable terminal 100 executes a cancellation action in a state in which preview data is displayed on the digital photo frame 300 that is not the transfer destination intended by the user.

Then, if the disconnected device (the digital photo frame 300) is found as a result of the user of the portable terminal 100 having searched for a device in executing a transfer action while holding the portable terminal 100 to transfer data to the intended transfer destination (the personal computer 200), the portable terminal 100 preferentially connects to a device other than the disconnected device. The portable terminal 100 can, by holding information (e.g., MAC address) for identifying a connection target device when searching for a connection target, preferentially connect to, when a device having such information is disconnected by a cancellation action, a device other than the disconnected device by lowering the priority of the disconnected device.

Figure 11:
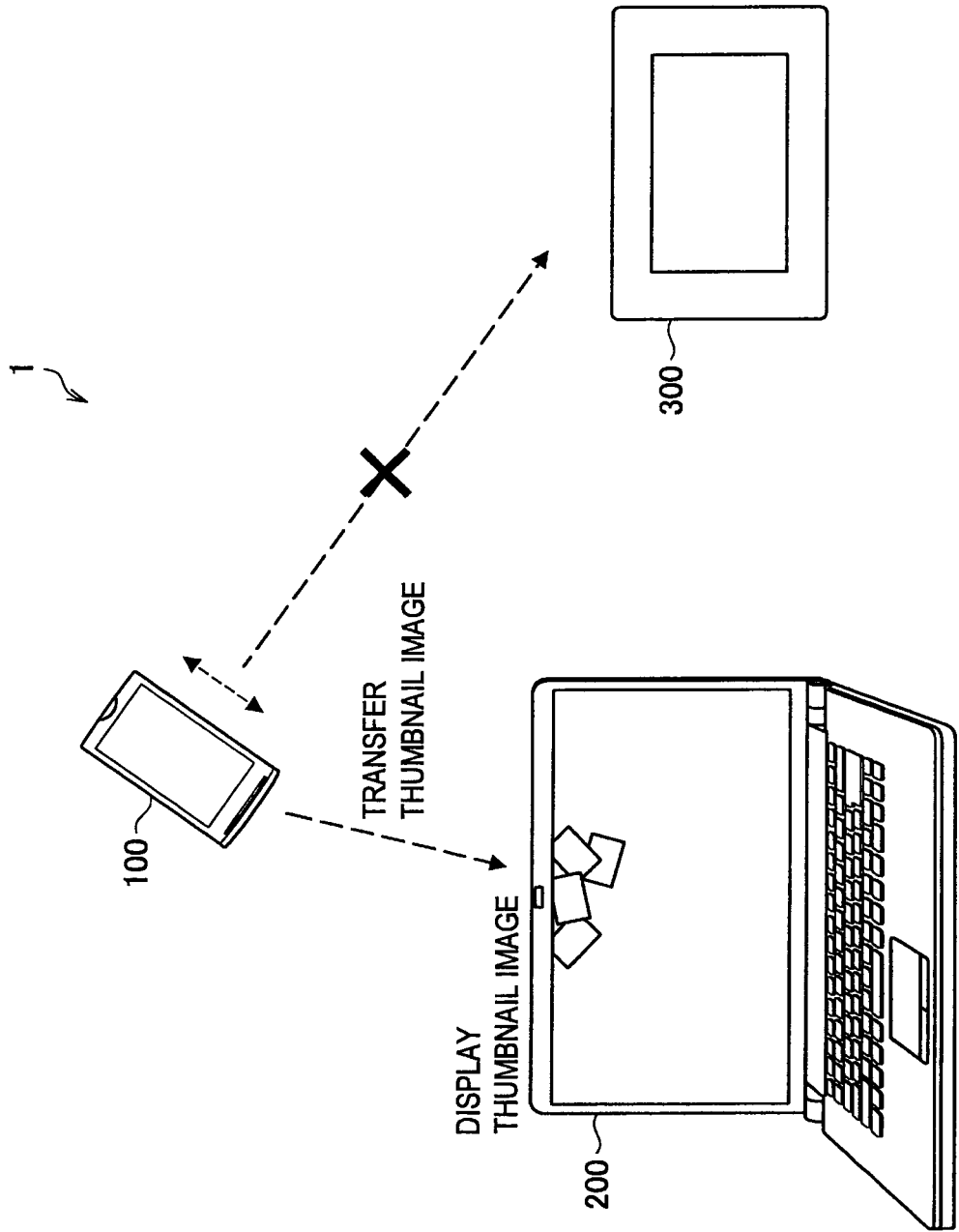
FIG. 11 is an explanatory diagram showing a view in which a user of the portable terminal 100 executes a transfer action after a cancellation action.

FIG. 11 is an explanatory diagram showing a view in which the user of the portable terminal 100 executes a transfer action after executing the cancellation action as shown in FIG. 10. FIG. 11 shows a view in which the portable terminal 100 determines a connection target so that the portable terminal 100 preferentially connects to the personal computer 200, not to the disconnected digital photo frame 300.

Note that data transfer in the first transfer action can be implemented by, other than a method of actually copying the target data to the connection target device, streaming from the connection source device without copying the data. In addition, in the present disclosure, the data to be transferred need not be recorded on the connection source device. Thus, data placed in a server different from the transfer source device may be transferred to the connection target with, as a trigger, a transfer action executed on the connection source device.

In the aforementioned embodiment, a transfer action is divided into two stages: the connection/preview transfer and the main data transfer. However, how the transfer action is divided is not limited to such example. In addition, the transfer action may be divided into three or more stages. For example, when a transfer action is performed, the following variations are considered.

(Variation 1)

First: Transfer a currently displayed phonograph whose connection target is designated.

Second: Transfer all photographs in the same folder as the photograph transferred previously.

(Variation 2)

First: Designate only a connection target. The connection target device returns a feedback with some method.

Second: Confirm the information to be transferred. Display preview data of the information to be transferred to the connection target device.

Third: Transfer actual data.

FIG. 12 is an explanatory diagram showing an overview of the operation of the information processing system 1 in accordance with an embodiment of the present disclosure. Herein, an operation of transmitting image data, document data, or other types of electronic data from the portable terminal 100 to the personal computer 200 when the operation based on the transfer action is divided into three stages as in Variation 2 above will be described.

When the portable terminal 100 transmits image data, document data, or other types of electronic data to the personal computer 200, the portable terminal 100 and the personal computer 200 are first in the "(A) initial state." This initial state is a connection initialization state in which a connection is not yet established between the portable terminal 100 and the personal computer 200. The portable terminal 100 should identify a target device to transfer data to with some method.

In this embodiment, the user of the portable terminal 100 executes a specific transfer action near a device (the personal computer 200) to transfer electronic data to while holding the portable terminal 100, whereby the portable terminal 100 detects the transfer action, and establishes a connection with the personal computer 200. This state will be referred to as a "(B) connection target determined state." In this case, the personal computer 200 may return a feedback with some method using sound, light, or the like.

In the connection target determined state, when the user of the portable terminal 100 executes a specific transfer action near a device (the personal computer 200) to transfer electronic data to while holding the portable terminal 100, the portable terminal 100 transfers preview data of the electronic data to be transferred (if the electronic data is image data, thumbnail data of the image data) to the personal computer 200. This state will be referred to as a "(C) connected state." The specific action herein is an action that is identical to the action of transitioning state from the initial state to the connected state. The personal computer 200 outputs the transmitted preview data to the output device 217. Accordingly, the user of the portable terminal 100 can visually check if the device connected by the specific transfer action is the target device to transfer electronic data to.

In the connected state, the user of the portable terminal 100 executes a specific transfer action near a device (the personal computer 200) to transfer electronic data to while holding the portable terminal 100, whereby the portable terminal 100 detects the transfer action and transfers to the personal computer 200 the actual data of the electronic data to be transferred. Such a state will be referred to as a "(D) transferred state." In this embodiment, the specific action herein is an action that is identical to the action of transitioning state from the initial state to the connection target determined state or from the connection target determined state to the connected state.

Meanwhile, in the connected state, when the user of the portable terminal 100 executes a specific cancellation action while holding the portable terminal 100, the portable terminal 100 detects the cancellation action, and instructs the personal computer 200 to delete the transferred preview data.

Likewise, in the connection target determined state, when the user of the portable terminal 100 executes a specific cancellation action while holding the portable terminal 100, the portable terminal 100 detects the cancellation action and cancels the connection with the personal computer 200, and then returns to the initial state. Note that in the connected state, when the user of the portable terminal 100 executes a specific cancelation action while holding the portable terminal 100, the portable terminal 100 may be configured to, in addition to instructing the personal computer 200 to delete the preview data, cancel the connection with the personal computer 200 and restore to the initial state.

<2. Conclusion>

As described above, according to an embodiment of the present disclosure, a series of processes such as determination of a connection target, transfer, and cancellation are implemented interactively and consecutively when data is to be transferred between devices. Accordingly, a user can advance an operation while intuitively understanding what kind of process will be performed to which device, and reduce the possibility that an operation may be executed on an erroneous target.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1)
An information processing device comprising:
a movement detection unit configured to detect a specific operation; and
a process execution unit configured to, when the movement detection unit detects the specific operation, execute a process in accordance with the specific operation, wherein
in a case in which the movement detection unit has detected a first specific operation and the process execution unit has executed a first process in accordance with the first specific operation, if the movement detection unit further continuously detects the first specific operation, the process execution unit executes a second process that is continuous with the first process, and if the movement detection unit detects a second specific operation meaning a cancellation of the first process, the process execution unit executes a third process that cancels the first process.

(2)
The information processing device according to (1), wherein the process execution unit establishes a connection with a data transfer destination as the first process, transfers data to the data transfer destination as the second process, and cancels the established connection with the data transfer destination as the third process.

(3)
The information processing device according to (2), wherein the process execution unit, before establishing a connection with the data transfer destination as the first process, establishes a connection with a device estimated to be the nearest by wireless communication.

(4)
The information processing device according to (2) or (3), wherein the process execution unit, after establishing a connection with the data transfer destination, cancels the established connection with the data transfer destination, and when establishing a connection with a data transfer destination again, preferentially attempts a connection with a device other than the device connected immediately before the attempt.

(5)
The information processing device according to any one of (2) to (4), wherein the process execution unit, upon establishing a connection with the data transfer destination as the first process, causes the data transfer destination to execute a process related to the first process.

(6)
The information processing device according to (5), wherein the process execution unit, upon cancelling the established connection with the data transfer destination as the third process, causes the data transfer destination to execute a process related to the third process.

(7)
An information processing method comprising:
a movement detection step of detecting a specific operation;
a first process execution step of, when the movement detection step detects the specific operation, executing a process in accordance with the specific operation;
a second process execution step of, in a case in which the movement detection step has detected a first specific operation and the first process execution step has executed a first process in accordance with the first specific operation, if the movement detection step further continuously detects the first specific operation, executing a second process that is continuous with the first process; and
a third process execution step of, in a case in which the movement detection step has detected a first specific operation and the first process execution step has executed a first process in accordance with the first specific operation, if the movement detection step detects a second specific operation meaning a cancellation of the first process, executing a third process of cancelling the first process.

(8)
A computer program for causing a computer to execute:
a movement detection step of detecting a specific operation;

a first process execution step of, when the movement detection step detects the specific operation, executing a process in accordance with the specific operation;

a second process execution step of, in a case in which the movement detection step has detected a first specific operation and the first process execution step has executed a first process in accordance with the first specific operation, if the movement detection step further continuously detects the first specific operation, executing a second process that is continuous with the first process; and a third process execution step of, in a case in which the movement detection step has detected a first specific operation and the first process execution step has executed a first process in accordance with the first specific operation, if the movement detection step detects a second specific operation meaning a cancellation of the first process, executing a third process of cancelling the first process.

The present disclosure contains subject matter related to that disclosed in Japanese Priority Patent Application JP 2011-107108 filed in the Japan Patent Office on May 12, 2011, the entire content of which is hereby incorporated by reference.

What is claimed is:

1. An information processing device comprising:
   a movement detection unit configured to detect a specific operation; and
   a process execution unit configured to, when the movement detection unit detects the specific operation, execute a process in accordance with the specific operation, wherein
   in a case in which the movement detection unit has detected a first specific operation and the process execution unit has executed a first process in accordance with the first specific operation, if the movement detection unit further continuously detects the first specific operation, the process execution unit executes a second process that is continuous with the first process, and if the movement detection unit detects a second specific operation meaning a cancellation of the first process, the process execution unit executes a third process that cancels the first process,
   wherein at least one of the movement detection unit and the process execution unit is implemented via a processor.

2. The information processing device according to claim 1, wherein the process execution unit establishes a connection with a data transfer destination as the first process, transfers data to the data transfer destination as the second process, and cancels the established connection with the data transfer destination as the third process.

3. The information processing device according to claim 2, wherein the process execution unit, before establishing a connection with the data transfer destination as the first process, establishes a connection with a device estimated to be the nearest by wireless communication.

4. The information processing device according to claim 2, wherein the process execution unit, after establishing a connection with the data transfer destination, cancels the established connection with the data transfer destination, and when establishing a connection with a data transfer destination again, preferentially attempts a connection with a device other than the device connected immediately before the attempt.

5. The information processing device according to claim 2, wherein the process execution unit, upon establishing a connection with the data transfer destination as the first process, causes the data transfer destination to execute a process related to the first process.

6. The information processing device according to claim 5, wherein the process execution unit, upon cancelling the established connection with the data transfer destination as the third process, causes the data transfer destination to execute a process related to the third process.

7. An information processing method comprising:
   a movement detection step of detecting a specific operation;
   a first process execution step of, when the movement detection step detects the specific operation, executing a process in accordance with the specific operation;
   a second process execution step of, in a case in which the movement detection step has detected a first specific operation and the first process execution step has executed a first process in accordance with the first specific operation, if the movement detection step further continuously detects the first specific operation, executing a second process that is continuous with the first process; and
   a third process execution step of, in a case in which the movement detection step has detected a first specific operation and the first process execution step has executed a first process in accordance with the first specific operation, if the movement detection step detects a second specific operation meaning a cancellation of the first process, executing a third process of cancelling the first process,
   wherein at least one of the movement detection step, the first process execution step, the second process execution step, and the third process execution step, is implemented via a processor.

8. A non-transitory computer-readable medium having embodied thereon a program, which when executed by a computer causes the computer to perform a method, the method comprising:
   a movement detection step of detecting a specific operation;
   a first process execution step of, when the movement detection step detects the specific operation, executing a process in accordance with the specific operation;
   a second process execution step of, in a case in which the movement detection step has detected a first specific operation and the first process execution step has executed a first process in accordance with the first specific operation, if the movement detection step further continuously detects the first specific operation, executing a second process that is continuous with the first process; and
   a third process execution step of, in a case in which the movement detection step has detected a first specific operation and the first process execution step has executed a first process in accordance with the first specific operation, if the movement detection step detects a second specific operation meaning a cancellation of the first process, executing a third process of cancelling the first process.

9. The information processing device according to claim 1, wherein the process execution unit is further configured to execute different processes in accordance with a same detected specific operation, based on a current operation state of the information processing device.

10. The information processing device according to claim 9, wherein the process execution unit executes different processes within different operation states of the information processing device, in response to a same detected specific operation.

11. The information processing device according to claim 1, wherein the first process and the second process are different processes.

12. The information processing device according to claim 2, wherein the process execution unit further transfers thumbnails corresponding to the data to the data transfer destination as the first process.

* * * * *